United States Patent
Dagher et al.

(10) Patent No.: US 12,310,816 B2
(45) Date of Patent: May 27, 2025

(54) FLEXIBLE ABUTMENT FOR USE WITH DENTAL IMPLANT

(71) Applicant: Mazen Dagher, L'Orignal (CA)

(72) Inventors: Mazen Dagher, L'Orignal (CA); Craig A. Elliott, Ottawa (CA)

(73) Assignee: DAGHER INSTITUTE INC., Hawkesbury (CA)

( * ) Notice: Subject to any disclaimer, the term of this patent is extended or adjusted under 35 U.S.C. 154(b) by 665 days.

(21) Appl. No.: 17/424,000

(22) PCT Filed: Jan. 20, 2020

(86) PCT No.: PCT/CA2020/050058
§ 371 (c)(1),
(2) Date: Jul. 19, 2021

(87) PCT Pub. No.: WO2020/150812
PCT Pub. Date: Jul. 30, 2020

(65) Prior Publication Data
US 2022/0023011 A1    Jan. 27, 2022

Related U.S. Application Data

(60) Provisional application No. 62/795,838, filed on Jan. 23, 2019.

(51) Int. Cl.
*A61C 8/00*    (2006.01)
(52) U.S. Cl.
CPC .......... *A61C 8/0054* (2013.01); *A61C 8/0057* (2013.01); *A61C 8/0068* (2013.01)
(58) Field of Classification Search
CPC ... A61C 8/0037; A61C 8/0039; A61C 8/0054; A61C 8/0056; A61C 8/0057;
(Continued)

(56) References Cited

U.S. PATENT DOCUMENTS

| | | | |
|---|---|---|---|
| 4,713,004 A | | 12/1987 | Linkow et al. |
| 5,873,721 A | * | 2/1999 | Willoughby ......... A61C 8/0048 433/172 |

(Continued)

FOREIGN PATENT DOCUMENTS

| | | |
|---|---|---|
| DE | 102010011145 A1 | 2/2013 |
| EP | 2046238 A2 | 4/2009 |

(Continued)

OTHER PUBLICATIONS

International Search Report in related, co-pending PCT Application No. PCT/CA2020/050058, mailed Apr. 8, 2020.

*Primary Examiner* — Jacqueline T Johanas
*Assistant Examiner* — Jennifer P Connell
(74) *Attorney, Agent, or Firm* — Thomas | Horstemeyer, LLP

(57) ABSTRACT

An abutment for use in combination with a dental prosthesis and a dental implant configured for implantation in an osseous structure is provided. The abutment comprises an abutment wall comprising a flexural region comprising a shoulder portion and an abutment recess located below the shoulder portion when the abutment is in an upright position. The flexural region is configured to enable at least a vertical movement of an upper portion of the abutment relative to a lower portion of the abutment when the abutment is subjected to a loading force. There is also provided a retention assembly comprising a first member and a second member each positionable within a longitudinally extending abutment channel of an abutment in a spaced apart relationship to define an abutment chamber therebetween. A method for implanting a dental implant assembly into a mouth of a patient is also provided.

20 Claims, 11 Drawing Sheets

(58) Field of Classification Search
CPC ..... A61C 8/006; A61C 8/0074; A61C 8/0075; A61C 8/0068; A61C 8/0086; A61C 8/005; A61C 8/0053; A61C 8/0063; A61C 8/0065

See application file for complete search history.

(56) References Cited

U.S. PATENT DOCUMENTS

| | | | |
|---|---|---|---|
| 6,283,753 B1 | 9/2001 | Willoughby | |
| 9,204,943 B1 | 12/2015 | Zadeh | |
| 9,872,757 B2 | 1/2018 | Kelly et al. | |
| 2002/0177105 A1 | 11/2002 | Engman | |
| 2003/0224328 A1* | 12/2003 | Sapian | A61C 8/0086 433/173 |
| 2006/0014120 A1 | 1/2006 | Sapian | |
| 2006/0246396 A1 | 11/2006 | Suttin et al. | |
| 2007/0099151 A1 | 5/2007 | Tan et al. | |
| 2010/0015571 A1* | 1/2010 | Al-Attar | A61C 8/0012 433/173 |
| 2014/0011160 A1 | 1/2014 | Jorneus et al. | |
| 2014/0045144 A1 | 2/2014 | Dukhan | |
| 2014/0141388 A1* | 5/2014 | Dukhan | A61C 8/008 433/174 |
| 2014/0363788 A1* | 12/2014 | Ouellette | A61C 8/0024 433/201.1 |
| 2015/0157426 A1* | 6/2015 | Choi | A61C 8/0068 433/174 |
| 2015/0173863 A1 | 6/2015 | Mittelstadt et al. | |

FOREIGN PATENT DOCUMENTS

| | | | | |
|---|---|---|---|---|
| EP | 2143398 A1 * | 1/2010 | | A61C 8/005 |
| EP | 2601906 A1 | 6/2013 | | |
| ES | 2524946 A1 * | 12/2014 | | A61C 8/0053 |
| WO | 0217814 A1 | 3/2002 | | |
| WO | WO-2004032786 A1 * | 4/2004 | | A61C 8/0048 |
| WO | WO-2008077443 A1 * | 7/2008 | | A61C 8/0016 |
| WO | WO-2016098921 A1 * | 6/2016 | | A61C 13/1026 |

* cited by examiner

FLEXIBLE ABUTMENT FOR USE WITH DENTAL IMPLANT

CROSS REFERENCE TO RELATED APPLICATIONS

This application is the 35 U.S.C. § 371 national stage application of PCT Application No. PCT/CA2020/050058, filed Jan. 20, 2020, which application claims the benefit of U.S. Provisional Application No. 62/795,838, filed Jan. 23, 2019, both of which are hereby incorporated by reference herein in their entireties.

TECHNICAL FIELD

The technical field generally relates to dental implant assemblies. In particular, the technical field relates to dental implant assemblies having a flexible abutment.

BACKGROUND

Dental implant assemblies can be used in dentistry to replace one or more missing teeth, as an alternative to dentures and bridgework. A dental implant assembly generally includes a dental implant that is screwed into the jawbone of a patient, and a process called osteointegration allows the bone to fuse with the dental implant. The fusion of the bone with the dental implant ensures that the dental implant remains stable and in the proper position. Once this healing process is completed, which can take a few weeks, an abutment is coupled with the dental implant to eventually support a dental prosthesis or crown, i.e., the artificial replacement tooth. A conventional abutment is generally shaped as a post having threads to be screwed into the dental implant, with a part of the abutment remaining exposed above the gum so that the dental prosthesis can have a support for attachment. Finally, the dental prosthesis can be cemented or screwed to the exposed part of the abutment to be securely fixed thereto, and by extension, to the dental implant. Other types of dental prosthesis can also be removably secured to the abutment.

However, the combination of conventional dental implants, abutments and dental prosthesis can have several drawbacks. For instance, with a dental implant, mastication or occlusion forces can be directly transmitted to the surrounding bone, since the gum structure usually present around a natural tooth, such as periodontal ligaments, is no longer there. This effect can modify the sensory function of the patient leading to a reduced control in the biting force, which in turn can increase the risk of failure of the dental implant.

Thus, there is a need for improved components of dental implant assemblies.

SUMMARY

In accordance with an aspect, there is provided an abutment for use in combination with a dental implant configured for implantation in an osseous structure and with a dental prosthesis. The abutment comprises a first end portion engageable with the dental implant; a second end portion opposed the first end portion and engageable with the dental prosthesis; an abutment wall having an outer surface and an inner surface, the inner surface of the abutment wall defining an abutment channel extending longitudinally therethrough; a flexural region successively comprising a shoulder portion and a recess, the recess being closer to the first end portion than the shoulder portion, each one of the shoulder portion and the recess extending along at least a portion of a circumference of the abutment. The flexural region is configured to enable a substantially vertical displacement of the second end portion of the abutment when subjected to a loading force.

In some implementations, the abutment channel has a larger diameter at a location corresponding to the shoulder portion.

In some implementations, the flexural region defines one of a S-shaped flexural region, a wave-like flexural region and a boustrophedonic-like flexural region.

In some implementations, the flexural region has a substantially constant wall thickness.

In some implementations, the abutment is a monolithic structure.

In accordance with another aspect, there is provided a retention assembly for use in combination with a dental implant configured for implantation in an osseous structure and with an abutment having a first end portion engageable with the dental implant and a second end portion opposed the first end portion and engageable with a dental prosthesis. The retention assembly comprises a male member positionable within a longitudinally extending abutment channel of the abutment. The retention assembly also comprises a female member positionable within a section of the longitudinally extending abutment channel located in the second end portion of the abutment, the female member comprising a female member receiving channel configured to receive the male member.

In some implementations, the female member is fastenable to the abutment.

In some implementations, when the male member is engaged with the female member, a female member chamber is defined in an upper portion of the female member receiving channel to enable a vertical sliding movement of the female member relative to the male member.

In some implementations, the female member is configured to abut a transversal surface within the longitudinally extending abutment channel such that when subjected to a force, the female member acts as a stopper to limit movement of the female member.

In accordance with another aspect, there is provided a retention assembly for use in combination with a dental implant configured for implantation in an osseous structure and with an abutment having a first end portion engageable with the dental implant and a second end portion opposed the first end portion and engageable with a dental prosthesis. The retention assembly comprises a first fastening member positionable within a longitudinally extending abutment channel of the abutment. The retention assembly also comprises a second fastening member positionable within a section of the longitudinally extending abutment channel located in the second end portion of the abutment.

In accordance with another aspect, there is provided a kit comprising an abutment comprising a first end portion engageable with the dental implant; a second end portion opposed the first end portion and engageable with the dental prosthesis;

an abutment wall having an outer surface and an inner surface, the inner surface defining an abutment channel extending longitudinally therethrough; a flexural region successively comprising a shoulder portion and a recess, the recess being closer to the first end portion than the shoulder portion, each one of the shoulder portion and the recess extending along at least a portion of a circumference of the abutment, wherein the flexural region is configured to enable a substantially vertical displacement of the abutment when subjected to a loading force; and a retention assembly comprising a male member positionable within the abutment channel, and a female member positionable within a section of the abutment channel located in the second end portion of the abutment, the female member comprising a female member receiving channel configured to receive the male member.

In accordance with another aspect, there is provided an abutment for use in combination with a dental prosthesis and with a dental implant configured for implantation in an osseous structure. The abutment comprises an abutment wall having an outer surface and an inner surface, the inner surface defining a longitudinally extending abutment channel, the abutment wall comprising a flexural region comprising a shoulder portion and an abutment recess located below the shoulder portion when the abutment is in an upright position, each one of the shoulder portion and the abutment recess extending along at least a portion of a circumference of the abutment wall; wherein the longitudinally extending abutment channel has a diameter that is larger at the shoulder portion than at the abutment recess; and wherein the flexural region is configured to enable at least a vertical movement of an upper portion of the abutment relative to a lower portion of the abutment when the abutment is subjected to a loading force.

In some implementations, the flexural region is configured to enable a horizontal movement of the upper portion of the abutment relative to the lower portion of the abutment.

In some implementations, the shoulder portion has a frustoconical shape.

In some implementations, the abutment wall has a wall thickness that is substantially constant throughout the flexural region.

In some implementations, the abutment wall has a wall thickness that varies along the flexural region.

In some implementations, the flexural region forms a monolithic structure with a remaining of the abutment.

In some implementations, the abutment and the dental implant are integral with each other.

In some implementations, the lower portion of the abutment is configured to be received in a dental implant cavity defined in the dental implant.

In some implementations, the abutment and the dental implant are joined together by cold welding.

In some implementations, the longitudinally extending abutment channel is configured to receive a retention assembly therein to engage the abutment with the dental implant.

In some implementations, the flexural region is configured to enable the vertical movement of the upper portion of the abutment relative to the lower portion of the abutment within a range of about 10 microns to about 90 microns.

In some implementations, the flexural region is configured to enable the horizontal movement of the upper portion of the abutment within a range of about 10 microns to about 110 microns.

In some implementations, the flexural region comprises a plurality of abutment recesses.

In some implementations, the flexural region comprises a plurality of shoulder portions.

In some implementations, the flexural region comprises at least one of an S-shaped flexural region, a wave-like flexural region, a bellow-like region, and a boustrophedonic-like flexural region.

In some implementations, the flexural region extends along an entire circumference of the abutment.

In some implementations, at least one of the shoulder portion and the abutment recess is provided at an angle relative to a transverse axis of the abutment.

In some implementations, the abutment is made of at least one of titanium, titanium alloy, surgical grade stainless steel, gold alloy, zirconia, polyether ether ketone (PEEK) and shape memory alloys.

In accordance with another aspect, there is provided a retention assembly for use in combination with a dental implant configured for implantation in an osseous structure and with an abutment having a lower portion engageable with the dental implant and an upper portion engageable with a dental prosthesis. The retention assembly comprises a male member positionable within a longitudinally extending abutment channel of the abutment; and a female member positionable within the longitudinally extending abutment channel and in the upper portion of the abutment, the female member comprising a female member receiving channel defined by a downwardly extending wall and being configured to receive at least a portion of the male member within the female member receiving channel.

In some implementations, the female member is fastenable to the abutment.

In some implementations, the female member is fastenable to the abutment via threads.

In some implementations, the male member is fastenable to the abutment.

In some implementations, the male member is fastenable to the abutment via threads.

In some implementations, the male member is engageable with the dental implant.

In some implementations, when the at least a portion of the male member is received within the female member receiving channel, a female member chamber is defined in an upper portion of the female member receiving channel to enable the female member to move downwardly and upwardly in a piston-like movement relative to the male member when the female member is subjected to a loading force.

In some implementations, a lower end of the downwardly extending wall is configured to abut a transversal surface of the abutment within the longitudinally extending abutment channel to stop the piston-like movement of the female member when the loading force is above a given threshold.

In some implementations, the lower end of the downwardly extending wall has a complimentary shape relative to the transverse surface of the abutment against which the lower end abuts.

In some implementations, the female member chamber is at least partially filled with a compressible material.

In some implementations, the female member chamber is at least partially filled with a gas.

In some implementations, the female member chamber is at least partially filled with air.

In some implementations, the compressible material comprises PTFE.

In some implementations, the compressible material is selected to allow a given range of vertical sliding movement of the female member relative to the male member.

In some implementations, the retention assembly further comprises a lubricant layer between an inner surface of the female member receiving channel and an outer surface of the at least a portion of the male member.

In some implementations, the lubricant layer comprises at least one of PTFE and silicone.

In some implementations, the male member and the female member are configured to limit horizontal movement of the abutment up to a horizontal travel threshold.

In some implementations, at least one of the male member and the female member is sized and configured to allow the abutment to move in a selected direction while minimizing movement of the abutment in another direction.

In some implementations, at least one of the female member and the male member is made of plastic or metal.

In some implementations, the female member is made of PTFE.

In some implementations, the female member is made of titanium.

In some implementations, the male member is made of PTFE.

In some implementations, the male member is made of titanium.

In some implementations, the abutment is as defined herein.

In accordance with another aspect, there is provided a retention assembly for use in combination with a dental implant configured for implantation in an osseous structure and with an abutment having a lower portion engageable with the dental implant, an upper portion engageable with a dental prosthesis and a longitudinally extending abutment channel. The retention assembly comprises a first member and a second member each positionable within the longitudinally extending abutment channel in a spaced apart relationship to define an abutment chamber therebetween; wherein the first member is engageable with the lower portion of the abutment, and the second member is fixedly engageable with the abutment in the upper portion thereof.

In some implementations, the abutment chamber allows a combination of the second member and the upper portion of the abutment to move downwardly relative to the first member.

In some implementations, the first member is engageable with the lower portion of the abutment via threads.

In some implementations, the second member is fixedly engageable with the upper portion of the abutment via threads.

In some implementations, the first member is further engageable with the dental implant.

In some implementations, the abutment chamber is at least partially filled with a compressible material.

In some implementations, the abutment chamber is at least partially filled with a gas.

In some implementations, the abutment chamber is at least partially filled with air.

In some implementations, the compressible material comprises PTFE.

In some implementations, the compressible material is selected to allow a downward movement of the second member relative to the first member.

In some implementations, the first member and the second member are configured to allow a lateral rocking motion of the abutment relative to the dental implant.

In some implementations, at least one of the first member and the second member is made of plastic or metal.

In some implementations, the first member is made of PTFE.

In some implementations, the first member is made of titanium.

In some implementations, the second member is made of PTFE.

In some implementations, the second member is made of titanium.

In some implementations, the abutment is as defined herein.

In accordance with another aspect, there is provided a kit comprising a dental implant; an abutment comprising an abutment wall having an outer surface and an inner surface, the inner surface of the abutment wall defining a longitudinally extending abutment channel, the abutment wall comprising a flexural region comprising a shoulder portion and an abutment recess located below the shoulder portion when the abutment is in an upright position, each one of the shoulder portion and the abutment recess extending along at least a portion of a circumference of the abutment; and a retention assembly comprising a first member and a second member each positionable within the longitudinally extending abutment channel in a spaced apart relationship and defining an abutment chamber therebetween, the first member being engageable with a lower portion of the abutment, and the second member being engageable with the abutment in an upper portion thereof.

In some implementations, the abutment is as defined herein.

In some implementations, the retention assembly is as defined herein.

In accordance with another aspect, there is provided a dental implant assembly comprising a dental implant; an abutment having a lower portion engaged with the dental implant, the abutment comprising: an abutment wall having an outer surface and an inner surface, the inner surface of the abutment wall defining a longitudinally extending abutment channel, the abutment wall comprising a flexural region comprising a shoulder portion and an abutment recess located below the shoulder portion when the abutment is in an upright position, each one of the shoulder portion and the abutment recess extending along at least a portion of a circumference of the abutment; and a retention assembly comprising a first member and a second member each positioned within the longitudinally extending abutment channel in a spaced apart relationship and defining an abutment chamber therebetween, the first member being engaged with a lower portion of the abutment and the second member being engaged with an upper portion of the abutment.

In some implementations, the abutment is has defined herein.

In some implementations, the retention assembly is as defined herein.

In accordance with another aspect, there is provided a method for implanting a dental implant assembly comprising an abutment comprising a longitudinally extending abutment channel and a dental implant comprising a dental implant cavity into a mouth of a patient, the combination of the longitudinally extending abutment channel and the dental implant cavity defining a combined channel. The method comprises inserting a first member of a retention assembly into the combined channel; engaging the first member of the retention assembly with the dental implant and with a lower portion of the abutment; inserting a second member of the retention assembly into the combined channel above the first member and in a spaced apart relationship therewith to define an abutment chamber between the first member and the second member; and fixedly engaging the second member of the retention assembly with an upper portion of the abutment.

In some implementations, the first member is a male member and the second member is a female member comprising a female member receiving channel defined by a downwardly extending wall, and wherein inserting the second member of the retention assembly into the combined channel above the first member and in a spaced apart relationship therewith comprises positioning the female member such that at least a portion of the male member is received into the female member receiving channel.

In some implementations, the engaging of the first member of the retention assembly with the dental implant comprises fastening the first member of the retention assembly with the dental implant via threads.

In some implementations, the fixedly engaging of the second member of the retention assembly with the upper portion of the abutment comprises fastening the second member of the retention assembly with the upper portion of the abutment via threads.

DETAILED DESCRIPTION

Figure 1:
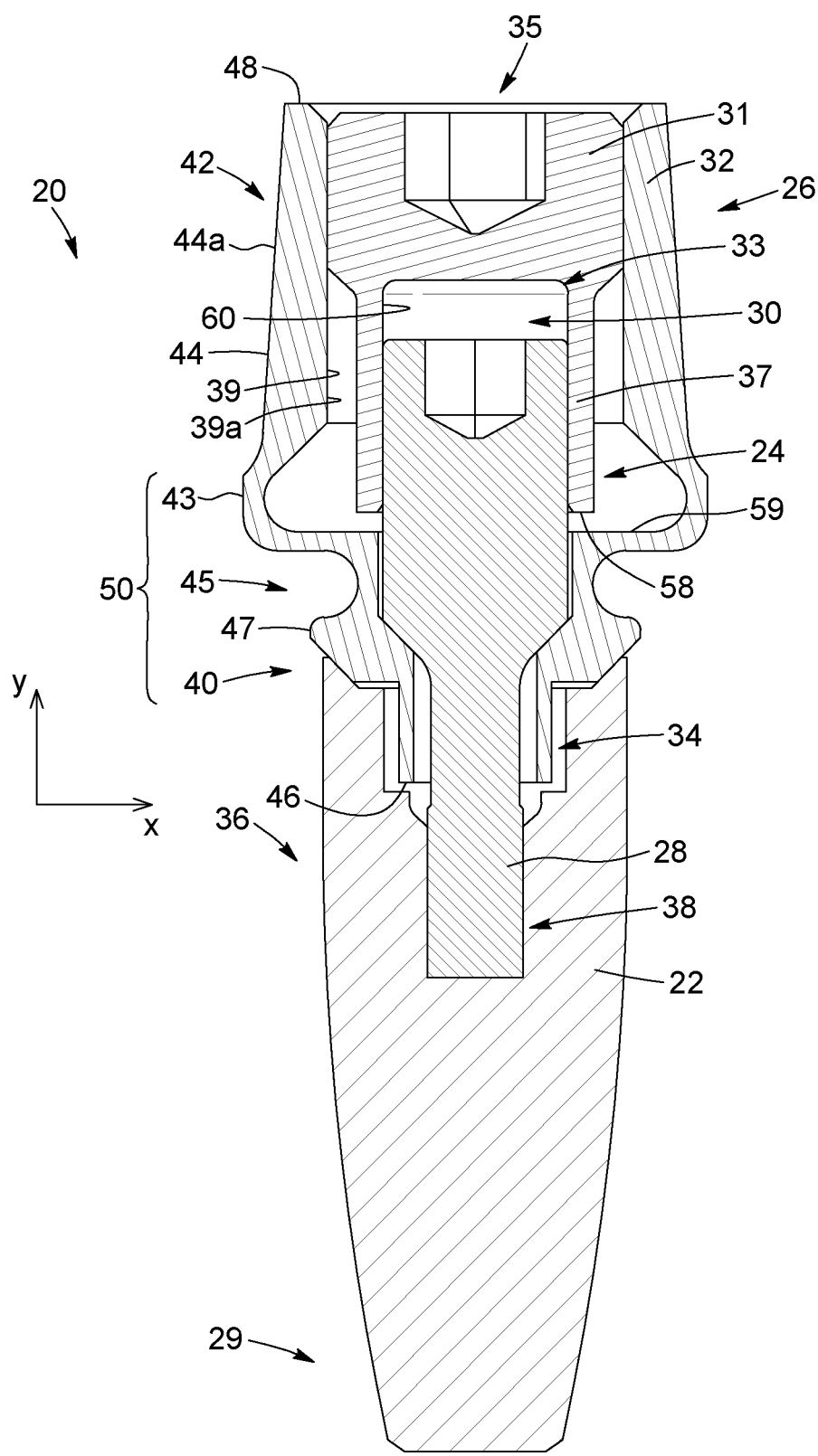
FIG. 1 is a cross-sectional view of a flexible abutment and a retention assembly according to an embodiment, for use as components of a dental implant assembly.

In the following description, there are described various implementations related to an abutment for use in combination with a dental implant and a dental prosthesis, to form a dental implant assembly that can be used as a dental replacement, for instance for a fixed single-tooth restoration. The abutment can include a flexural region defined by the abutment wall, generally in a lower portion thereof, to facilitate vertical and horizontal movements of the abutment when the abutment is subjected to forces such as mastication forces. In some implementations, the flexural region can form a monolithic structure with the rest of the abutment, i.e., the flexural region can be integral with the rest of the abutment.

It is to be noted that although the implementations of the dental implant assembly comprising an abutment having a flexural region as described herein and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation thereinbetween, as well as other suitable geometrical configurations, may be used for the dental implant assembly, as will be briefly explained herein and as can be easily inferred herefrom by a person skilled in the art. It is also to be noted that in the drawings, the same numerical references refer to similar elements.

Moreover, it will be appreciated that positional descriptions such as "above", "below", "inwardly", "outwardly", "vertical", "horizontal", "longitudinal", "transversal" "lower", "upper" and the like should, unless otherwise indicated, be taken in the context of the figures and should not be considered limiting. In particular, when referring to a lower portion of an element, for instance a lower portion of an abutment, it is to be understood that it refers to a lower portion along a vertical axis (see FIG. 1, vertical axis y), i.e., a portion closer to the osseous structure, when the dental implant assembly is positioned in a patient's mouth. Correspondingly, when referring to an upper portion, for instance an upper portion of an abutment, the term "upper" is intended to refer to an upper portion along the vertical axis y, i.e., further away from the osseous structure than a lower portion, once the dental implant assembly is positioned in a patient's mouth. The term "longitudinally", for instance when referring to a dental implant cavity that extends longitudinally, is intended to mean along the vertical axis y, i.e., along the longitudinal axis of the dental implant assembly. The terms "vertically" and "longitudinally", in the context of the present description, are therefore sometimes used interchangeably. Correspondingly, the term "transversally" is intended to mean along a transversal axis (see FIG. 1, horizontal axis x), perpendicular to the longitudinal axis y. The terms "horizontally" and "transversally", in the context of the present description, are therefore sometimes used interchangeably.

In general terms, the present disclosure concerns an abutment for use in combination with a dental implant, a retention assembly and a dental prosthesis. The abutment is configured to connect with the dental implant and with the dental prosthesis to form a dental implant assembly. The dental implant is configured for implantation in a bearing osseous tissue, such as a jaw bone, and is engageable with the abutment. The dental implant and the abutment can be secured to each other, or joined to each other, using at least one component of the retention assembly, and for instance using corresponding threads. In turn, the abutment is engageable with the dental prosthesis. The dental implant assembly can be used for example as a dental replacement, for instance for a fixed single-tooth restoration, or the combination of the dental implant, the abutment and the retention assembly can be used as an anchor for bridges or dentures.

The abutment includes a flexible region that is defined in a given portion of the abutment, for instance in lower portion of the abutment, which is a region located in proximity of an upper portion of the dental implant. It is to be understood that, in the context of the present description, the flexible region can also be referred to as a flexural region, for instance in implementations where the movement of the abutment is enabled at least in part by the presence of a flexure, or groove, defined by the wall of the abutment. In the present description, the expression "flexural region" is generally used to designate a region that includes at least one flexure. The flexural region of the abutment can contribute to enhance flexibility, resilience, relative movement of portions of the abutment relative to one another, and/or shock absorbing properties of the abutment, which in turn can contribute to reduce the stress imparted to the dental implant and the surrounding bone, as well as to the dental prosthesis itself, in response to bite forces and jaw movements associated with mastication. It is also to be understood that, in the context of the present description, the flexible abutment can be also be referred to as a shock-absorbing abutment, and the flexural region can be referred to as a shock-absorbing region.

In some implementations, the flexural region is configured to facilitate adjustment and/or compliance of the abutment in specific degrees of freedom. Providing an abutment with a flexural region can also contribute to compensate at least partially for the loss of proprioception feedback that monitors the load perception normally provided by the periodontal ligament. Indeed, the periodontal ligament plays an important role in absorbing compressive and tensile forces transmitted to the bone surrounding the root of the tooth during mastication, thereby reducing the loading on said bone, while the proprioceptors of the periodontal ligament are able to detect obstacles to occlusion and signal a proper reaction to avoid trauma to the tooth and bone. Without this shock absorbing property provided by the periodontal ligament, the dental prosthesis is subjected to a higher risk of fracture, the retention screw engaging the dental prosthesis to the abutment can loosen and even break, there can be bone loss around the dental implant, etc. In addition, the osteointegration of the dental implant precludes the dental implant assembly from having such mobility and shock absorbing properties. The flexural region of the abutment as described wherein can facilitate mimicking of the periodontal ligament functionality, which can be advantageous for increasing the durability of the dental implant assembly and increase the comfort of the patient, among others.

In addition, in implementations where the flexural region forms a monolithic structure with the rest of the abutment, the monolithic structure can contribute to reduce adhesion of bacteria and/or pathogens since interstices between components are absent.

Having discussed the general context of the dental implant assembly, optional implementations will be discussed hereinbelow. The implementations according to the following description are given for exemplification purposes only.

Dental Implant Assembly

Figure 3:
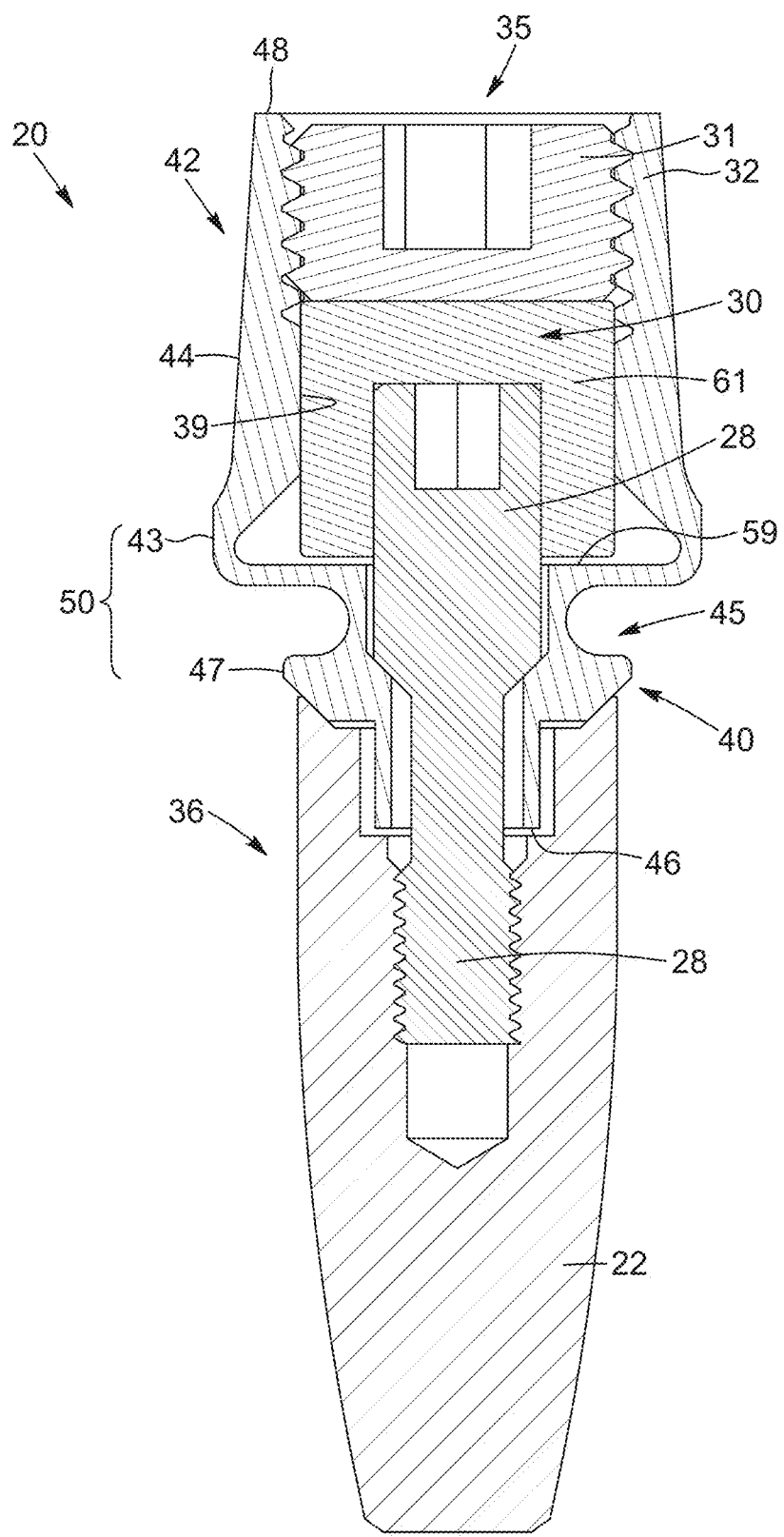
FIG. 3 is a cross-sectional view of a flexible abutment and a retention assembly according to another embodiment, for use as components of a dental implant assembly.
Figure 4:
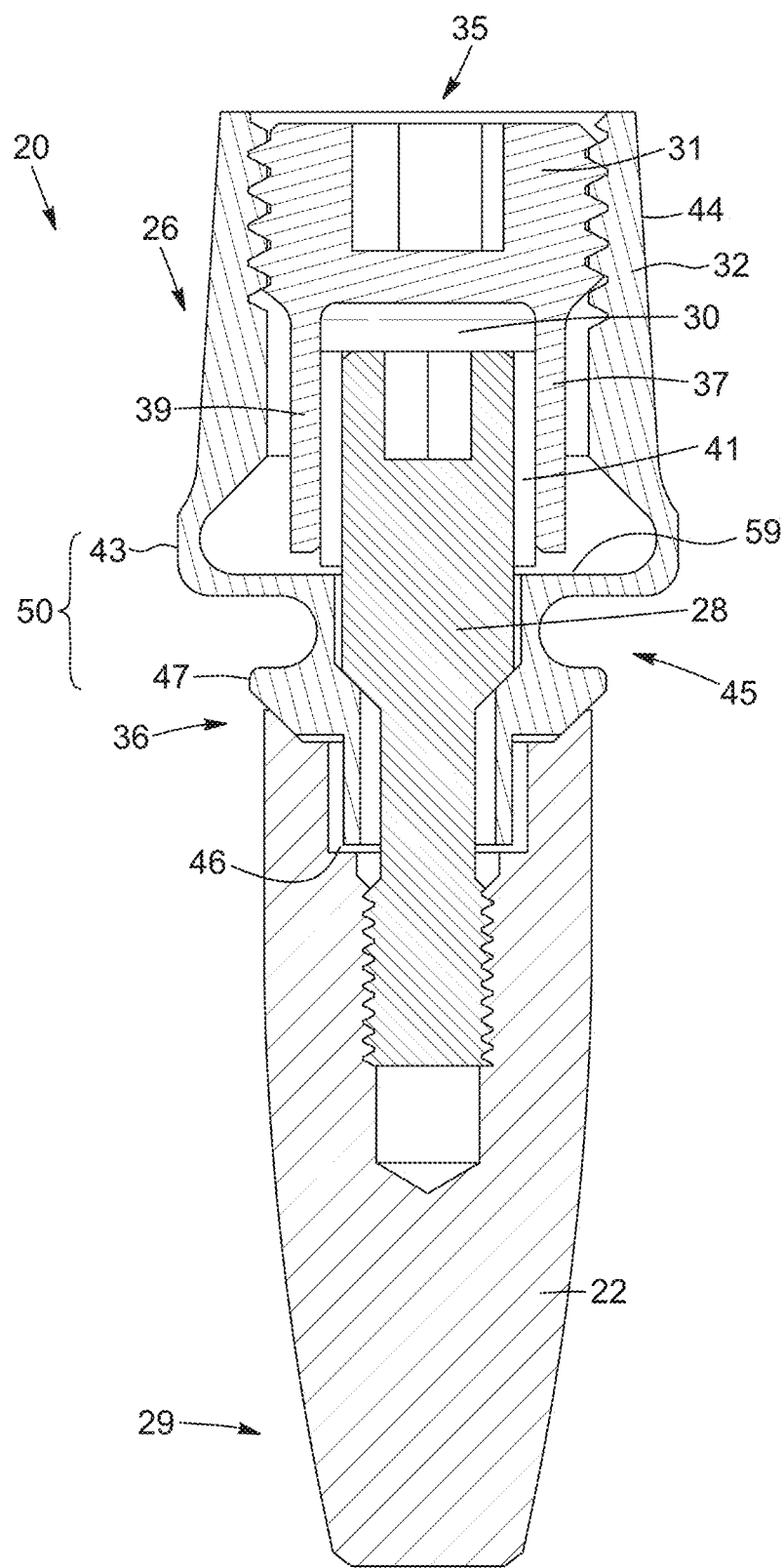
FIG. 4 is a cross-sectional view of a flexible abutment and a retention assembly according to another embodiment, for use as components of a dental implant assembly.
Figure 5:
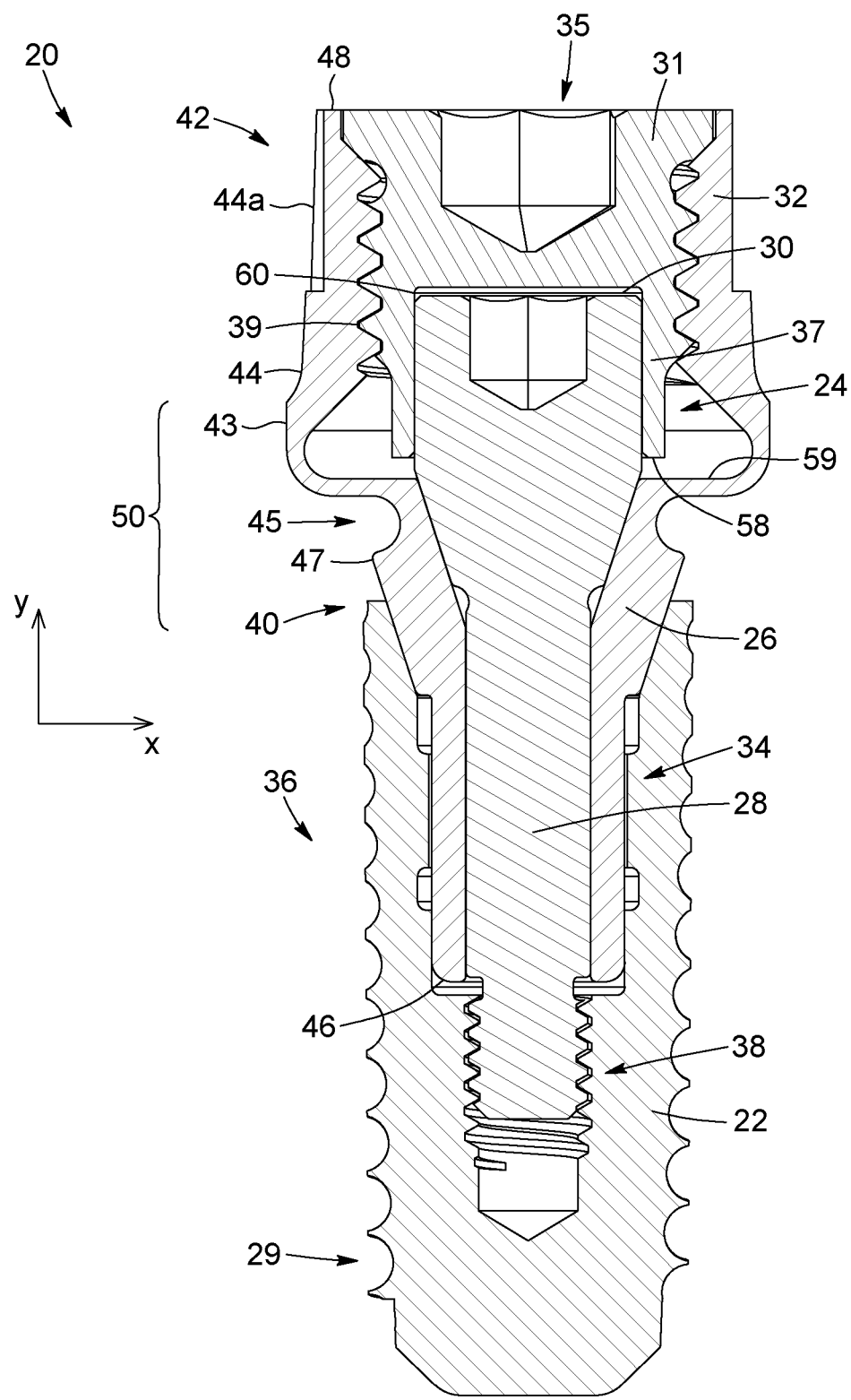
FIG. 5 is a cross-sectional view of a flexible abutment and a retention assembly according to another embodiment, for use as components of a dental implant assembly.
Figure 6:
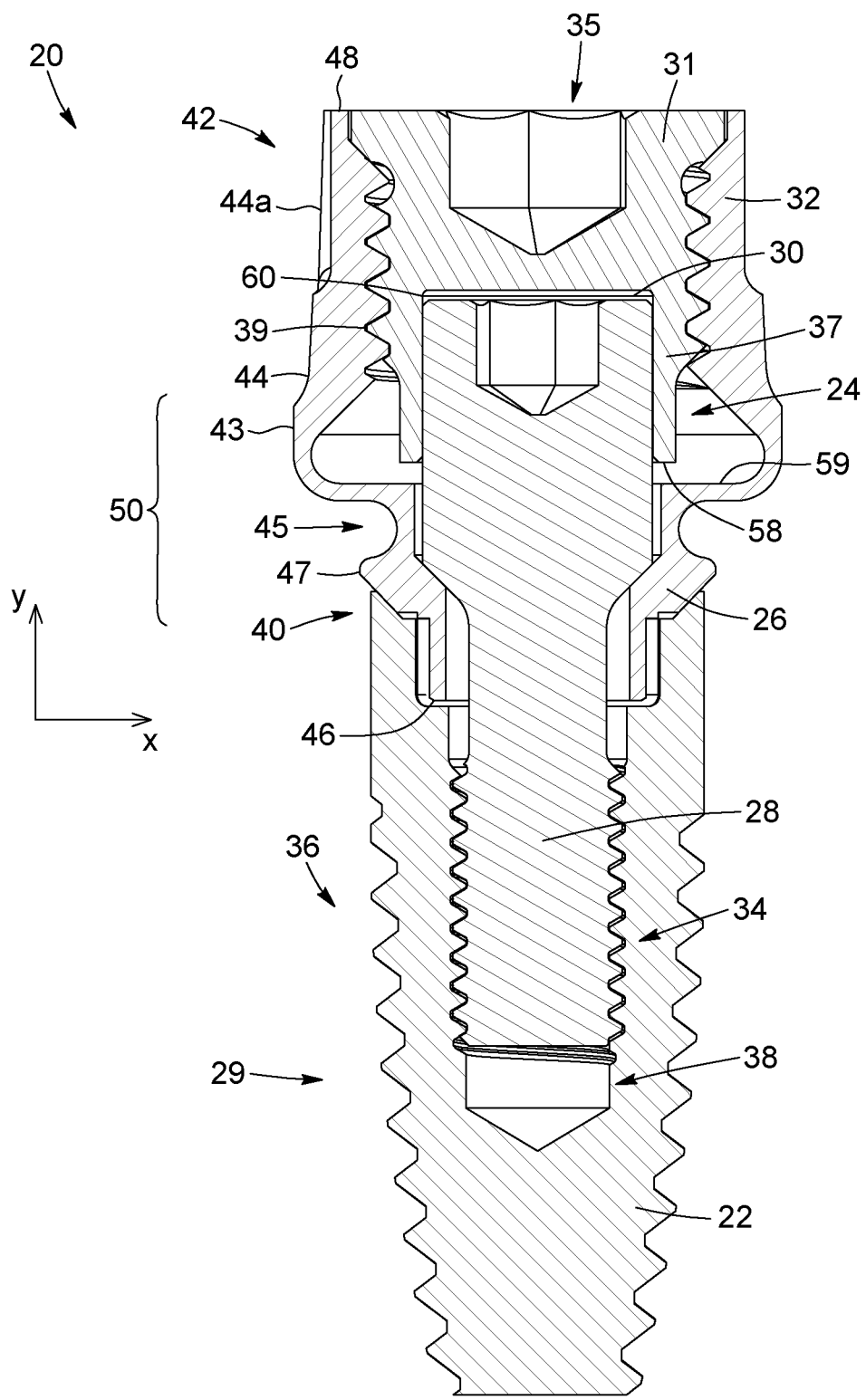
FIG. 6 is a cross-sectional view of a flexible abutment and a retention assembly according to another embodiment, for use as components of a dental implant assembly.
Figure 7A:
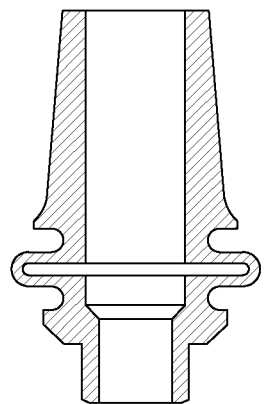
FIGS. 7A to 7F are cross-sectional views of flexible abutments according to other implementations.
Figure 7B:
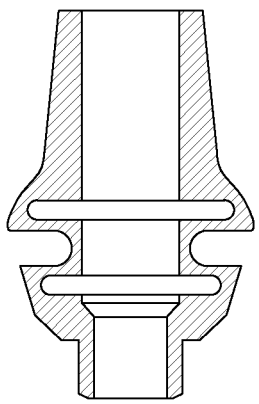
Figure 7C:
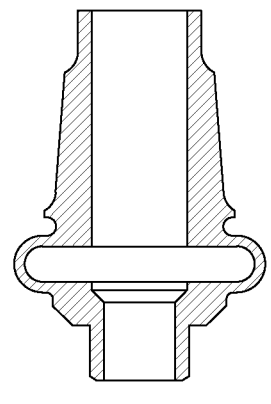
Figure 7D:
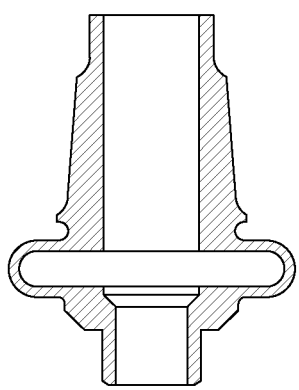
Figure 7E:
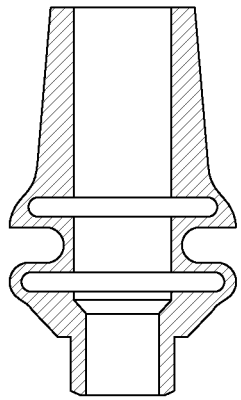
Figure 7F:
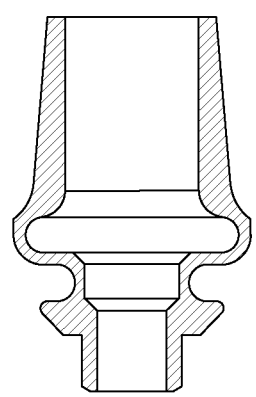

In accordance with an aspect and referring to FIGS. 1 to 6, there is provided a dental implant assembly 20 including a dental implant 22, a retention assembly 24, and an abutment 26. The dental implant assembly 20 can be suitable for use with a dental prosthesis (not shown). The dental implant 22 can be configured to be implanted in an osseous structure, such as a jaw bone. In some implementations, to facilitate proper implantation of the dental implant 22 within the osseous structure, the dental implant 22 can be provided with threads along an outer surface thereof (for instance as shown in FIGS. 5 and 6), such that the dental implant 22 can be screwed into the jaw bone. It is to be understood that in other implementations, any type of engagement feature allowing the dental implant 22 to be correctly implanted in the osseous structure as known in the art is within the scope of the present description.

A dental implant cavity 34 extending longitudinally along a longitudinal axis y of the dental implant 22 is defined within the dental implant 22, in an upper section 36 thereof. The upper section 36 of the dental implant 22 can also be referred to as a coronal part of the dental implant 22, while a lower section 29 of the dental implant 22 can be referred to as an apical part of the dental implant 22. The dental implant cavity 34 is configured to receive a lower portion 38 of an elongated retention screw 28, such that the lower portion 38 of the elongated retention screw 28 can engage with the dental implant 22. The engagement of the elongated retention screw 28 with the dental implant 22 is in accordance with the techniques know in the art for this type of engagement.

Retention Assembly

Referring now to FIGS. 1 to 6, the retention assembly 24 includes an elongated retention screw 28 and a capping screw 31. It is to be understood that although components 28 and 31 are referred herein as "screws", any other types of fastening, anchoring or retaining means can be used to fasten the various components of the retention assembly 24 together, as known in the art, for instance to fasten the capping screw 31 to the abutment 26, and to fasten the elongated retention screw 28 with the abutment 26 and/or the dental implant 22. It is to be noted that the capping screw 31 and the elongated retention screw 28 shown in FIGS. 1, 2 and 4 to 6 are not fixedly fastened to each other and are rather engaged together, to facilitate a movement of the capping screw 31 relative to the elongated retention screw 28. More details are provided below regarding this feature of the retention assembly 24.

The elongated retention screw 28 can have various shapes depending for instance on the properties of the dental implant assembly 20 that are sought after. In the implementations shown in FIGS. 1 to 6, the elongated retention screw 28 includes a shoulder portion having a substantially frustoconical shape and is configured to engage with a given portion of the abutment 26. The complimentary shape of the outer wall of the elongated retention screw 28 and of the inner surface 39 of the abutment 26 can contribute to facilitate the engagement of the elongated retention screw 28 with the abutment 26. It is also to be noted that the shape and/or the length of the elongated retention screw 28 can vary and/or be adapted depending on the desired properties of the abutment 26, for instance in terms of the degree of rigidity and/or flexibility that is desired to be obtained. In some implementations, the elongated retention screw 28 can be designed to have a diameter larger than a diameter of conventional retention screws for use with an abutment known in the art. In some implementations, the elongated retention screw 28 can be designed to be longer than a length of retention screws known in the art. The choice of a given combination of diameter and length for the elongated retention screw 28 for use with the flexible abutment 26 can be determined according to desired properties of the resulting dental implant assembly 20, for instance in terms of rigidity, flexibility, shock absorption etc. In some implementations, the diameter and/or the length of the elongated retention screw 28 can be chosen taking into consideration the outer diameter of the dental implant 22. In some scenarios and without being limitative, the diameter of the elongated retention screw 28 can be approximately up to half the diameter of the dental implant 22. In some scenarios and without being limitative, the diameter of the elongated retention screw 28 can be approximately up to 3 mm. In some implementations, the elongated retention screw 28 can be chosen to be longer than the length of conventional retention screws known in the art, which can contribute to control or limit movement of the flexible abutment in a particular direction, such as the horizontal flexion, or horizontal travel, of the flexible abutment 26.

In some implementations, the elongated retention screw 28 can include threads (shown in FIGS. 3 to 6), for engagement with a lower portion 40 of the abutment 26. The lower portion 40 of the abutment 26 can also be referred to as a first end portion of the abutment 26. The lower portion 40 of the abutment 26 extends longitudinally into the dental implant cavity 34 when used as part as the dental implant assembly 20. It is to be noted that in the implementations shown in FIGS. 1 to 4, the engagement of the dental implant 22 with the elongated retention screw 28, and in turn the engagement of the lower portion 40 of the abutment 26 with the elongated retention screw 28, are exemplary configurations only, and that other types of engagement are also within the scope of the present description.

In the implementations shown in FIGS. 1, 2 and 4 to 6, the capping screw 31 includes a downwardly extending wall 37 having a capping screw inner surface 60 defining a capping screw receiving channel 33, which can also be referred to as a female member receiving channel. In some implementations, the downwardly extending wall 37 can define a tubular shape, such that the capping screw receiving channel 33 can form a substantially cylindrical channel. The capping screw receiving channel 33 can be configured to receive at least a portion of the elongated retention screw 28. In the illustrated implementations, the capping screw receiving channel 33 forms a cylindrical channel configured to receive an upper portion of the elongated retention screw 28. In other words, the capping screw 31 defines a female member configured to receive an upper portion of the male member defined by the elongated retention screw 28. The length and the thickness of the downwardly extending wall 37 and the size of the capping screw receiving channel 33, can vary depending for instance of the desired rigidity and/or flexibility of the abutment 26.

In the implementations shown in FIGS. 1, 2 and 4 to 6, a portion of the capping screw receiving channel 33 is unoccupied by the elongated retention screw 28 when the elongated retention screw 28 is engaged with the capping screw 31, thereby defining a capping screw chamber 30. It is to be noted that in the context of the present description, the capping screw chamber 30 can also be referred to as a female member chamber when the capping screw chamber 30 and the elongated retention screw 28 form a male/female interaction. The capping screw chamber 30 provides a free space allowing the capping screw 31 to move downwardly relative to the elongated retention screw 28, for instance when subjected to a force. In turn, since the abutment 26 and the capping screw 31 are engaged together, or fasten to each other, the abutment 26 can also move downwardly relative to the elongated retention screw 28. In some implementations, the downward movement can be a substantially vertical movement, while in other implementations, the downward movement can include a combination of vertical movement and horizontal movement. In some implementations, the capping screw chamber 30 can be left as a free space. In other implementations, the capping screw chamber 30 can be filled with a given material, for instance a material that can be compressed. In yet other implementations, a portion of the capping screw chamber 30 can be filed with air while another portion can be filed with a compressible material. Although not shown in FIGS. 1 and 2 and as mentioned above, the abutment 26 can be engaged or fasten to the capping screw 31 through threads, as shown in FIGS. 3 to 6. The movement of the capping screw 31 relative to the elongated retention screw 28 can be interpreted as corresponding to a sliding motion, when a force is applied on the abutment 26, such as a piston-like movement moving up and down upon application of a force and removal thereof, the sliding motion comprising at least a vertical component along the vertical axis y.

Figure 2:
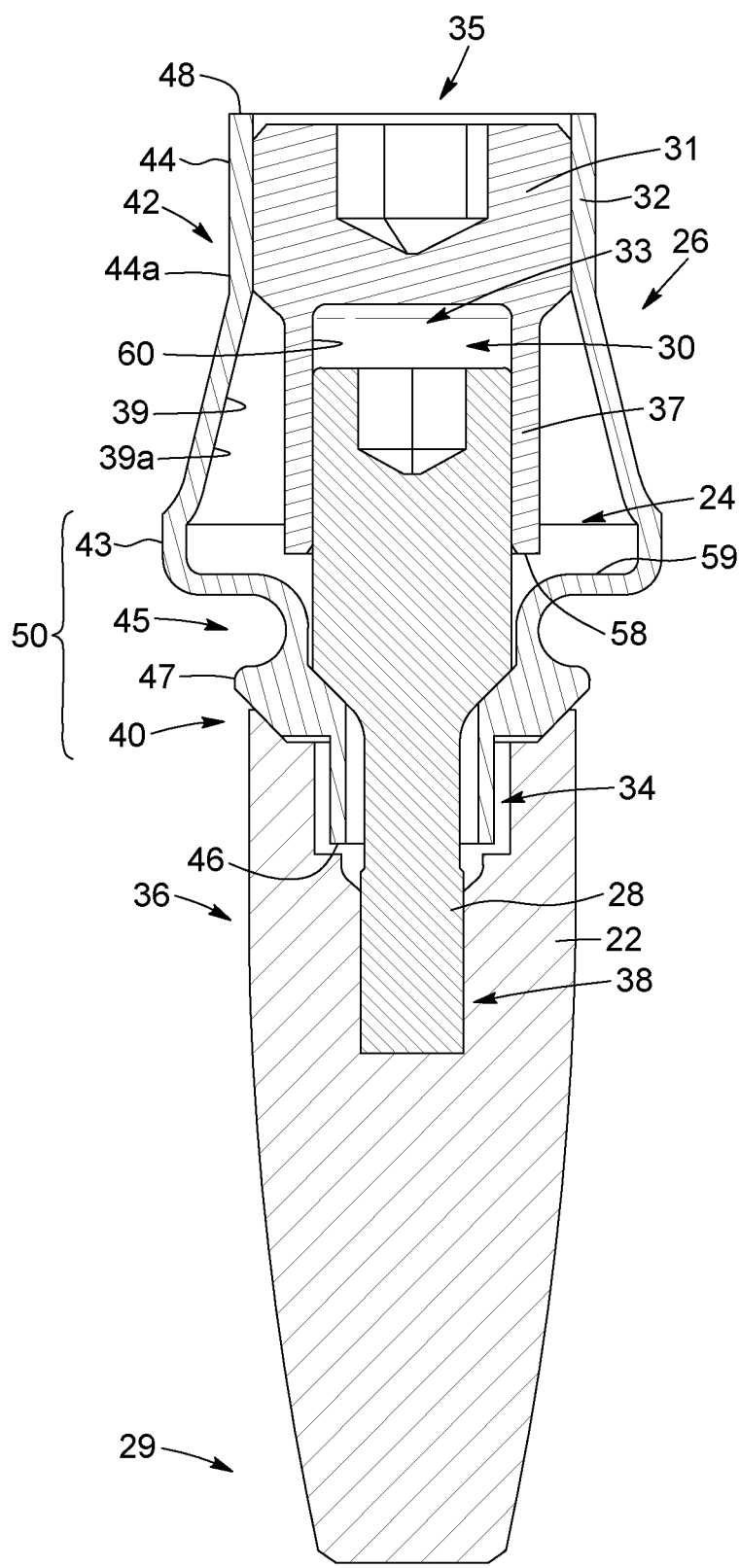
FIG. 2 is a cross-sectional view of a flexible abutment and a retention assembly according to another embodiment, for use as components of a dental implant assembly.

In some implementations and as shown in FIG. 3, the downwardly extending wall 37 of the capping screw 31 can be omitted, such that the interaction of the elongated retention screw 28 with the capping screw 31 is not one of a female/male interaction. This combination of the capping screw 31 with the elongated retention screw 28 as shown in FIG. 3 can result in an abutment channel 35 having a larger proportion that is unoccupied by the components of the retention assembly 24 and by the capping screw 31 compared to the implementations shown in FIGS. 1, 2 and 4 to 6. In some implementations, such a configuration can contribute to provide given characteristic to the dental implant assembly, for instance in terms of structural integrity, displacement and fatigue. In some implementations, the absence of the downwardly extending wall 37 defining the capping screw receiving channel 33 can contribute to facilitate a lateral rocking motion of the abutment 26 relative to the implant 22.

In some implementations and as shown in FIG. 4, a layer of lubricant 41 can be used to facilitate the movement of the capping screw 31 relative to the elongated retention screw 28, such as the sliding movement in a vertical direction along the vertical axis y of the capping screw 31 relative to the elongated retention screw 28. The lubricant 41 can be any lubricant having suitable mechanical properties. For instance, in some implementations, the lubricant 41 can include a polymer such as polytetrafluoroethylene (PTFE), ultra-high-molecular-weight polyethylene (UHMWPE), silicone (e.g., silicone grease) or the like. In FIG. 4, the capping screw 31 includes the downwardly extending wall 37, and the lubricant 41 is shown between the inner surface of the downwardly extending wall 37 and the outer surface of the elongated retention screw 28.

In some implementations and as shown in FIG. 3, the downwardly extending wall 37 of the capping screw 31 can be omitted, such that the interaction of the elongated retention screw 28 with the capping screw 31 is not one of a female/male interaction. This combination + of the capping screw 31 with the elongated retention screw 28 as shown in FIG. 3 can result in an abutment channel 35 having a larger proportion that is unoccupied by the components of the retention assembly 24 and by the capping screw 31 compared to the implementations shown in FIGS. 1, 2 and 4 to 6. In some implementations, such a configuration can contribute to provide given characteristic to the dental implant assembly, for instance in terms of structural integrity, displacement and fatigue. In some implementations, the absence of the downwardly extending wall 37 defining the capping screw receiving channel 33 can contribute to facilitate a lateral rocking motion of the abutment 26 relative to the implant 22.

In implementations such as the one shown in FIG. 3, there can thus be a larger free space between the capping screw 31 and the elongated retention screw 28 compared to when the capping screw 31 includes the downwardly extending wall 37. It is to be noted that in some implementations, such as the implementation shown in FIG. 3, the elongated retention screw 28 can be referred to as a first member, the capping screw 31 can be referred to as a second member, and the capping screw chamber 30 can be referred to as an abutment chamber. In some implementations, the capping screw chamber 30 can be occupied by a stopper 61. In some implementations, there can be a remaining space filled with air between the capping screw 31 and the stopper 61 to allow the capping screw 31 to move downwardly freely, for instance until the capping screw 31 abuts the stopper 61. For instance, in some scenarios and without being limitative, the free space can be of between approximately 30 to 50 microns. In some implementations, the stopper 61 can be made of a compressible material, a resilient material, or a shock-absorbing material. For instance, the stopper 61 can be made of PTFE or of a gel.

The stopper 61 can therefore act as a component that allows a given range of movement when subjected to a force, while acting as a stopper to limit this movement once a threshold is reached. In some implementations, the stopper 61 can also be made of a plurality of materials, depending on the properties of the stopper 61 that are sought after. For example, the stopper 61 can include a first layer of compressible material in an upper portion thereof, and a second layer of a different compressible material in a lower portion thereof, the compressibility of the two materials being different.

As mentioned above, in some implementations, the combination and interaction of the elongated retention screw 28 with the capping screw 31 forming the retention assembly 24 can also contribute to reduce horizontal travel of the abutment 26, and/or limit the horizontal travel of the abutment 26 up to a horizontal travel threshold, for instance in response to the application of an angular force.

In some implementations, the capping screw 31 can be configured to guide and/or control the vertical movement and the horizontal movement of the abutment 26 in relation to the elongated retention screw 28 and the implant 22. In some implementations, the interaction of the abutment 26 and the capping screw 31, and optionally the elongated retention screw 28, can allow the abutment 26 to move in a selected direction while minimizing movement of the abutment 26 in another direction.

The elongated retention screw 28 and the capping screw 31 can be made of various materials. In some implementations and without being limitative, the elongated retention screw 28 and/or the capping screw 31 can be made for instance of a polymer, such as PTFE. In some implementations and without being limitative, the elongated retention screw 28 and/or the capping screw 31 can also be made of metals, such as titanium, a titanium alloy, or stainless steel. The elongated retention screw 28 and the capping screw 31 can be made of the same material, or can be made of distinct materials.

Abutment

The abutment 26 and corresponding features thereof will now be described in further detail.

With reference to FIGS. 1 to 6, the abutment 26 includes an abutment wall 32 having an inner surface 39 and an outer surface 44. The abutment 26 includes the lower portion 40 as described above (also referred to as the first end portion), the lower portion 40 terminating at a lower end 46 thereof. In the illustrated embodiment, the lower end 46 is represented by the outer surface of the abutment 26, at the lowest extremity thereof when the abutment 26 is standing upright such as when positioned in a patient's mouth. The abutment 26 also includes an upper portion 42 terminating at an upper end 48 of the abutment 26. It is to be noted that the upper portion 42 can also be referred to as a second end portion. In the illustrated embodiment, the upper end 48 is represented by the outer surface of the abutment 26, at the highest extremity thereof when the abutment 26 is standing upright such as when in a patient's mouth. In some implementations, the wall thickness of the abutment 26 can be between approximately 250 microns and 450 microns.

Still referring to FIGS. 1 to 6, the inner surface 39 of the abutment 26 defines an abutment channel 35 extending from to the upper end 48 of the abutment 26 the lower end 46 of the abutment 26. The abutment channel 35 shown in FIGS. 1 to 6 has two opposite open ends, a first open end at the lower end 46 thereof and a second open end at the upper end 48 thereof. As shown in FIGS. 1 to 6, the diameter of the abutment channel 35 can vary, for instance to allow the engagement with the capping screw 31 and/or the elongated retention screw 28, and/or to define a given profile to the abutment wall 32.

In other words, in some implementations and also as shown in FIGS. 1 to 6, the abutment channel 35 can have a varying diameter along its height, or along the vertical axis y, in particular for providing a proper receiving area for the elongated retention screw 28, and/or for allowing an adjustment of the elongated retention screw 28 during installation of the abutment 26, and for providing a proper receiving area for the capping screw 31 as well.

The abutment 26 shown in FIGS. 1 to 6 has a shape resembling to the combination of a frustoconical structure combined with a lower tube and an upper tube. In the implementations shown in FIGS. 1 to 6, the lower tube has a smaller diameter than the upper tube. It is to be understood that the abutment channel 35 can have a shape different than the one that is illustrated on FIGS. 1 to 6, as long as the abutment channel 35 allows receiving of the elongated retention screw 28 and engagement of the elongated screw 28 with the abutment 26 and with the dental implant 22, and allows receiving the capping screw 31 to engage with the abutment 26 and the receiving screw 28.

In the embodiment shown in FIGS. 1 to 6, the lower portion 40 of the abutment 26 is engageable with the elongated retention screw 28 and with the dental implant 22, while the upper portion 42 of the abutment 26 is engageable with a dental prothesis. As mentioned above, the dental prothesis can be, for instance and without being limitative, a crown, a bridge, and the like. The dental prosthesis can be connected to the abutment 26 as per methods known in the art. For instance, the dental prothesis can be a cement retained crown or a screw retained crown.

Still referring to FIGS. 1 to 6, the outer surface 44 of the abutment 26 defines a shoulder portion 43, an abutment recess 45, which could also be referred to as an abutment groove, and a protrusion 47. The shoulder portion 43 is a portion of the abutment wall 32 that protrudes, or extends, outwardly compared to the remainder of the abutment 26. In the implementations shown in FIGS. 1 to 6, the shoulder portion 43 and the abutment recess 45 extend circumferentially along the entire circumference of the abutment 26. The abutment recess 45 therefore provides a region where the abutment 26 has a reduced diameter compared to the diameter of the upper portion of the abutment 26, while the shoulder portion 43 provides a region having a larger diameter compared to the diameter of the upper portion of the abutment 26. In the implementations shown, the flexural region 50 successively comprises the shoulder portion 43 and the recess 45, the recess 45 being closer to the lower portion 40 (also referred to as the first end portion) than the shoulder portion 43.

The outer surface 44 of the abutment wall 32 defines an outer abutment profile 44a, while the inner surface 39 of the abutment wall 32 defines an inner abutment profile 39a. The combination of the outer abutment profile 44*a* and the inner abutment profile 39*a* defines a given shape of the abutment wall 32. In the implementations shown in FIGS. 1 to 6, the combination of the outer abutment profile 44*a* and the inner abutment profile 39*a* defines a substantially S-shaped abutment wall 32 in a lower portion of the abutment 26. In some implementations, the abutment channel 35 has a larger diameter at a location corresponding to the shoulder portion 43.

Although the S-shaped abutment wall 32 shown in FIGS. 1, 3 and 4 to 6 includes variations in the thickness of the abutment wall 32, it is to be understood that in some implementations and as shown in FIG. 2, the thickness of the abutment wall 32 can remain substantially constant. In other words, the S-shaped abutment wall 32 can be obtained without varying the thickness of the abutment wall 32.

With reference to FIG. 2, an abutment 26 according to another embodiment is shown. In this embodiment, the abutment wall 32 has a substantially constant wall thickness in the upper portion 42 of the abutment 26 and in the lower portion 40 of the abutment 26, except for protrusion 47. The outer abutment profile 44*a* and the inner abutment profile 39*a* thus follow a similar pattern, and variations in the diameter of the abutment channel 35 along the vertical axis of the abutment 26 define the shoulder portion 43 and the abutment recess 45, independently of the thickness of the abutment wall 32.

The succession of the shoulder portion 43 and the abutment recess 45, or the S-shaped abutment wall 32, defines a flexural region 50 that can be compliant in specific degrees of freedom. In some implementations, the flexural region 50 is designed such that a vertical movement and/or a horizontal movement of the abutment 26, or a vertical sliding motion of the abutment 26, is facilitated when subjected to a force and/or during angular loading. In some implementations, the vertical movement is within elastic limits of the material forming the abutment, i.e., is an elastic deformation. In some implementations, the vertical displacement can between about +10 microns to −45 microns, or of about 55 microns. In some implementations, the vertical displacement of the upper portion of the abutment 26 relative to the lower portion of the abutment 26 can range between about 10 microns to 90 microns. In comparison, the vertical displacement of natural teeth during routine mastication is estimated to be less than 30 microns. In some implementations, the flexural region 50 is configured to enable a horizontal movement of the abutment 26. For example, the flexural region 50 can be configured to enable a horizontal movement of the upper portion of the abutment 26 within a range of about 10 microns to about 110 microns. Without being bound by theory, it is postulated that once a flexible abutment is displaced by a similar amount to that of natural teeth that the adjacent natural teeth will begin to bear a greater share of the mastication force, which can contribute to act as a stop to prevent overtravel of the abutment flexure to values above the fatigue limit.

In some implementations, the thickness of the abutment wall 32 can vary. In some implementations, the wall thickness of the shoulder portion 43 can be determined to influence the flexibility and rigidity of the flexural region 50. For instance, in some implementations, a reduced wall thickness at the shoulder portion 43 compared to the wall thickness of the remaining of the abutment wall 32 of the abutment 26 can contribute to achieve the shock-absorbing properties of the flexural region 50. In some scenarios and without being limitative, the wall thickness of the shoulder portion 43 can range between approximately 0.2 mm to 0.5 mm.

It is to be noted that in other implementations than the ones shown in FIGS. 1 to 6, the abutment recess 45 can be intermittent and can comprise a series of recesses distributed circumferentially along the outer surface 44 of the abutment 26 and within the flexural region 50, in a given pattern. In yet other implementations, more than one abutment recess 45 can be defined by the abutment wall 32. Similarly, the shoulder portion 43 can be intermittent and can comprise a series of shoulder portions distributed circumferentially along the outer surface 44 of the abutment 26 and within the flexural region 50, in a given pattern. In some implementations, more than one abutment recess 45 and/or more than one shoulder portion 43 can be defined in the outer surface 44, vertically distributed along the abutment 26 when the abutment 26 is in an upright position, such as when in a patient's mouth. In some implementations, the combination of the outer abutment profile 44*a* and the inner abutment profile 39*a* defining the flexural region 50 can be said to represent for instance a bellow-like region, a wave-like region, or a boustrophedonic-like region.

In addition, the combination of the capping screw 31 and the elongated retention screw 28, and the positioning of these components within the abutment channel 35 and the proportion of space that they occupy within the abutment channel 35 can be chosen to contribute to prevent excess horizontal displacement of the abutment 26 and/or rocking motion of the abutment 26, and thus can facilitate improving the yield strength of the abutment 26, for instance to a threshold acceptable to sustain mastication forces. The diameter of the head of the elongated retention screw 28 (or the upper portion of the elongated screw 28) can be modified, for example to influence the stress level at the interface between the abutment 26 and the implant 22. In some implementations, an increased diameter of the elongated retention screw 28 can contribute to reduce the flexure length, which can result in a stiffer compliance. The stiffness, flexibility and/or rigidity of the flexural region 50 can be adjusted to suit the desired range of applications of the dental implant assembly 20 by varying the shape, length (or height when the abutment is standing upright such as in a patient's mouth) or thickness of the components of the flexural region, i.e., of at least one of the shoulder portion 43 and the abutment recess 45. The size and shape of the protrusion 47 can also be adjusted. When a series of indentations is used instead of or in addition to the abutment recess 45, the size and the pattern of the indentations can also be varied. The diameter of the abutment channel 35 can also vary to obtain the desired characteristics of the abutment 26.

The implementations shown in FIGS. 7A to 7F illustrate various profiles of flexural regions defined by the abutment wall 32, which can be chosen for instance according to the characteristics of the abutment 26 that one wants to achieve. It is to be understood by a person skilled in the art that other suitable configurations can be envisioned to provide a flexural region allowing a flexure of the abutment 26 when submitted to a loading force.

It is to be noted that the designation of the lower portion 40 and of the upper portion 42 as used herein is made to help represent the spatial positioning of the flexural region 50 along the longitudinal axis y of the abutment 26 with regard to the rest of the abutment 26. However, these designations are somewhat arbitrary and should not be given a restrictive interpretation. The lower portion 40 and the upper portion 42 are relative expressions and can be located according to various proportion ratios.

The abutment 26 can be made of various materials that are adapted for the primary functionality of the abutment, which is to provide an anchoring device for the dental prosthesis 28 while being a biocompatible material, i.e., a material that is non-toxic and suitable for interacting with biological tissues, in terms for instance of the antimicrobial/hygienic properties of the material. In some implementations, the abutment 26 can be made of titanium, titanium alloy, surgical grade stainless steel, gold alloy, zirconia or polyether ether ketone (PEEK). The abutment 26 can also be made of different alloys, including shape memory alloys, as long as the biocompatibility and the bifunctionality requirements for the dental implant assembly are met. In some implementations, titanium offers an advantageous combination of properties such as light weight, strength, resistance to corrosion and durability. Titanium can be for instance pure titanium, or it can be a titanium alloy, which typically includes 6% aluminum, 4% vanadium, 0.25% iron, 0.2% oxygen, and titanium. For instance, the titanium alloy can be Ti-6Al-4V in annealed condition. Regarding two-piece or single-piece dental implant assemblies, the material typically used is zirconia, but titanium alloys or other materials as known in the art are also within the scope of the present description. In some implementations, the abutment 26 can be made of more than one material. For instance, the lower portion 40 of the abutment 26 can be made of titanium, and the upper portion 42 of the abutment can be made of zirconia.

Flexural Region

As mentioned above, the abutment 26 comprises a flexural region 50. In some implementations, the flexural region 50 is integral with the rest of the abutment 26. For the purpose of this description, the expression "rest of the abutment" is used herein to refer to the regions of the abutment 26 other than the flexural region 50. In the context of the present description, the term "integral" refers to a flexural region 50 forming a monolithic structure (also referred herein as a monobloc structure) with the rest of the abutment 26.

The flexural region 50 is configured to provide a change in flexibility, resiliency, capability of providing relative movement between portions of the abutment, and/or shock absorption in a particular region of the abutment 26 compared to the rest of the abutment 26. In some implementations, the change in properties of the flexural region 50 compared to the rest of the abutment 26 can contribute to mimic at least in part the functionality of the periodontal ligament. In some implementations, the change in properties can enable relative movement between the first end portion and the second end portion. In some implementations, the displacement or deformation is within elastic limits. In some implementations, the relative movement is at least one of a horizontal movement and a vertical movement. For instance, in some implementations, the vertical movement can be in the range of about 10 microns to about 60 microns, while the horizontal movement can be in the range of about 10 microns to about 90 microns.

As mentioned above, in some implementations, the flexural region 50 and the rest of the abutment 26 can form a monolithic structure. This monolithic structure is in contrast with an abutment that includes separate components, one of these separate components having one or more sought-after properties compared to the remaining of the abutment, such as an increased flexibility. Indeed, when separate components are provided, the component having the desirable properties typically has to be glued, connected, attached, engaged or fixed in some manner to the remaining of the abutment. The abutment 26 having a monolithic structure as described herein can contribute to reducing the risk of infection around the implantation site of the dental implant assembly 20 by avoiding the presence of interstices and thereby reducing the infiltration of bacteria and/or pathogens therein, and increase the durability of the dental implant assembly 20 by reducing the risks of fracture of the abutment 26.

In some implementations, the flexural region 50 can be provided at an angle relative to the transversal axis x, i.e., the flexural region 50 does not necessarily extend parallelly along the transversal axis x. The positioning of the flexural region 50 can be determined for instance at least in part by the patient's needs.

In some implementations, the dental implant assembly 20, instead of being a three-piece assembly (i.e., a dental implant assembly 20 including a dental implant 22, an abutment 26 and a retention assembly 24 comprising the elongated retention screw 28 and the capping screw 31, as shown in FIGS. 1 to 6) can be a two-piece assembly, for instance a dental implant assembly including a dental implant and an abutment as described herein, which could be joined by cold welding or by other methods known in the art, or a single-piece dental implant where the dental implant 22 and the abutment 26 are integral with each other. In these implementations, a flexural region 50 as described herein can be part of the abutment component of the dental implant assembly 20.

In accordance with another aspect, there is provided a method for implanting a dental implant assembly 20 as described herein into a mouth of a patient. The dental assembly 20 comprises an abutment 26 comprising a longitudinally extending abutment channel 35 and a dental implant 22 comprising a dental implant cavity 34 which together define a combined channel that is configured to receive elements of a retention assembly 24 as described herein. The method comprises inserting a first member of the retention assembly 24 into the combined channel. The first member can be an elongated retention screw 28, as shown in FIGS. 1-6. The first member of the retention assembly is then engaged with the dental implant 22 and with a lower portion 40 of the abutment 26. In some implementations, the engagement of the first member of the retention assembly with the dental implant 22 can be done via threads, for instance as shown in FIGS. 5 and 6. Then, a second member of the retention assembly 24 is inserted into the combined channel above the first member when the dental implant assembly 20 is in an upright position, so as to position the first member and the second member in a spaced apart relationship. The spaced apart relationship between the first member and the second member allows to define an abutment chamber 30 between the first member and the second member. In some implementations and as mentioned above, the abutment chamber 30 can enable the second member to move in a piston-like manner relative to the first member when the retention assembly 24 is subjected to a loading force. When the second member of the retention assembly is a female member, the female member comprises a female member receiving channel defined by a downwardly extending wall, and inserting the second member of the retention assembly into the combined channel above the first member and in a spaced apart relationship therewith comprises positioning the female member such that at least a portion of the first member, or male member, can be received into the female member receiving channel. The second member of the retention assembly 24 can then be engaged with an upper portion of the abutment 26. In some implementations, the second member of the retention assembly 24 can be fixedly engaged with the upper portion of the abutment 26, for instance via threads.

Several alternative implementations and examples have been described and illustrated herein. The implementations of the abutment having a flexural region described above are intended to be exemplary only. A person of ordinary skill in the art would appreciate the features of the individual implementations, and the possible combinations and variations of the components. A person of ordinary skill in the art would further appreciate that any of the implementations could be provided in any combination with the other implementations disclosed herein. It is understood that the abutment may be embodied in other specific forms without departing from the central characteristics thereof. The present examples and implementations, therefore, are to be considered in all respects as illustrative and not restrictive, and the invention is not to be limited to the details given herein. Accordingly, while the specific implementations have been illustrated and described, numerous modifications come to mind. The scope of the invention is therefore intended to be limited solely by the scope of the appended claims.

Experimental Results

Various experiments were conducted to illustrate some aspects of the dental implant assembly described herein. In particular, experiments were conducted to compare the behavior of the flexible abutment described herein in response to various loading tests with the behavior of a combination of a conventional abutment known in the art.

Dynamic fatigue tests for endosseous dental implants were used as a basis for development of structural analysis and simulated fatigue testing. Some experiments included fatigue testing is conducted to 5 million cycles for frequencies greater than 2 Hz.

For reference, a typical dental implant as known in the art is expected to withstand a force of between approximately 35 and 37 lbf (155 to 165 N) for a duration of 5 million cycles at a 30° angle from vertical. For comparison, the forces during routine mastication of food such as carrots or meat is about 16 to 34 lbf (70 to 150 N). The maximum masticatory force in some people may reach up to 110 to 160 lbf (500 to 700 N).

Figure 8:
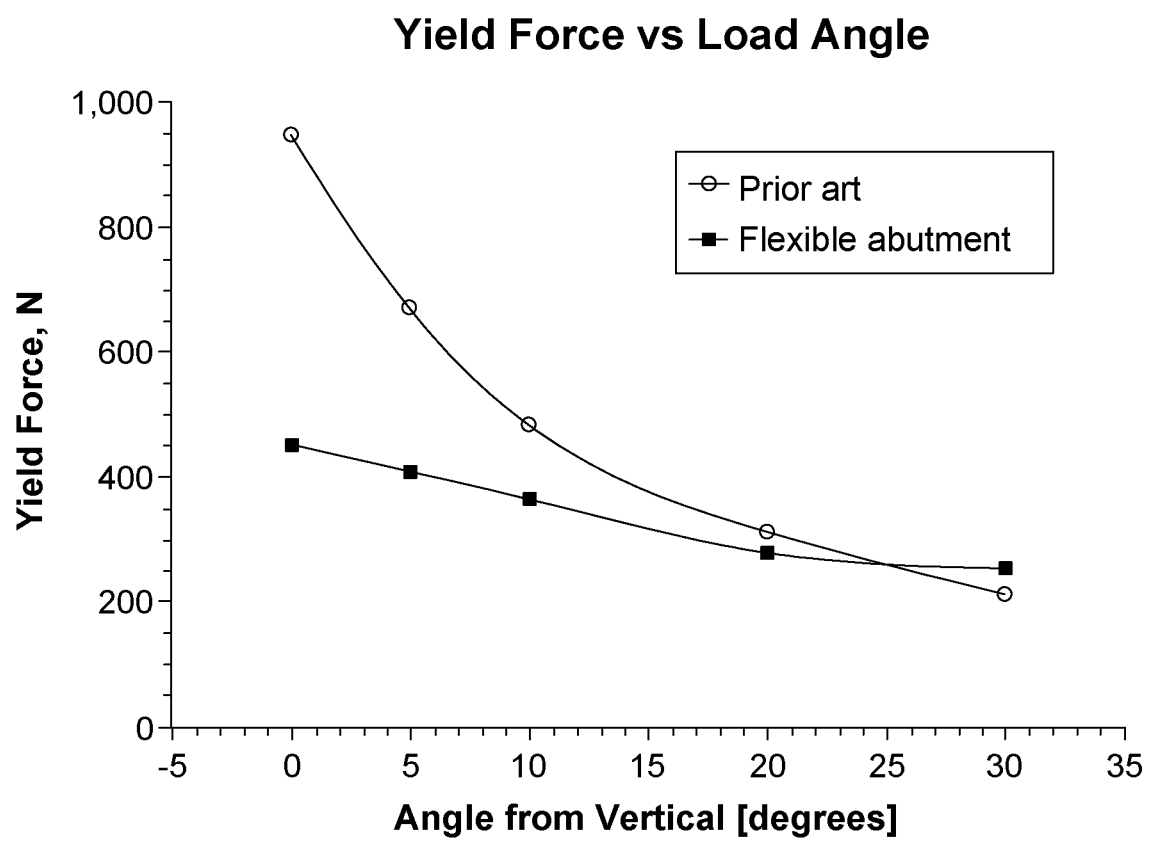
FIG. 8 is a graph of yield force versus load angle, for a conventional abutment versus a flexible abutment as described herein.

FIG. 8 is a graph showing the yield force versus load angle for a conventional abutment and a flexible abutment as described herein. The graph illustrates that the yield force curve for the flexible abutment is considerably flatter than the yield force curve obtained for the conventional abutment. For instance, it can be observed that for a given load angle of the abutment studied, the yield force is lower for the flexible abutment compared to the conventional abutment for load angles close to zero. In addition, FIG. 5 shows that the difference in yield force values between the conventional abutment and the flexible abutment subsides as the load angle increases.

Figure 9:
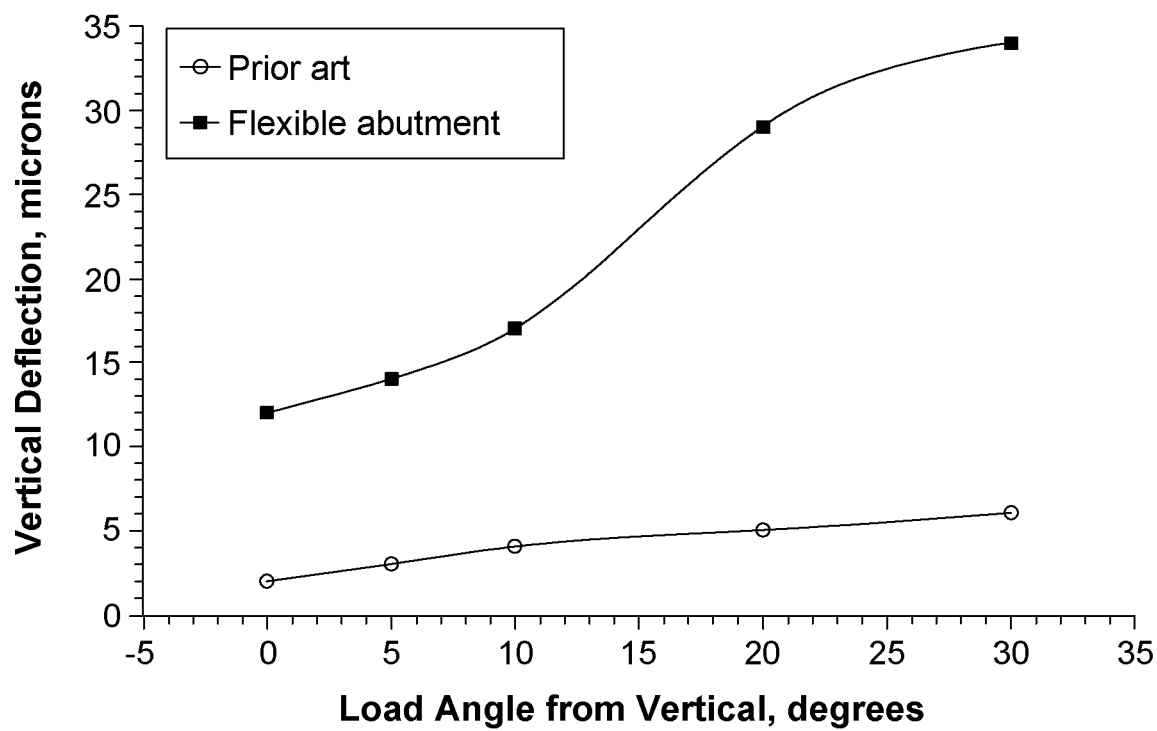
FIG. 9 is a graph of vertical deflection versus load angle at 110 N MMF, for a conventional abutment versus a flexible abutment as described herein.

FIG. 9 is a graph showing the vertical deflection versus the load angle at a mean mastication force of 110 N. FIG. 7 illustrates that the displacement of the conventional abutment is inferior to the expected displacement of natural teeth, which may leave considerable forces bearing on a singular implant during mastication. In contrast, the flexible abutment shows a range of displacements between 16 and 30 microns for an angular loading from 5 to 30 degrees. The zero-angle load case is expected to not be a likely outcome, as some amount of angular loading is expected to occur in most practical cases.

Figure 10:
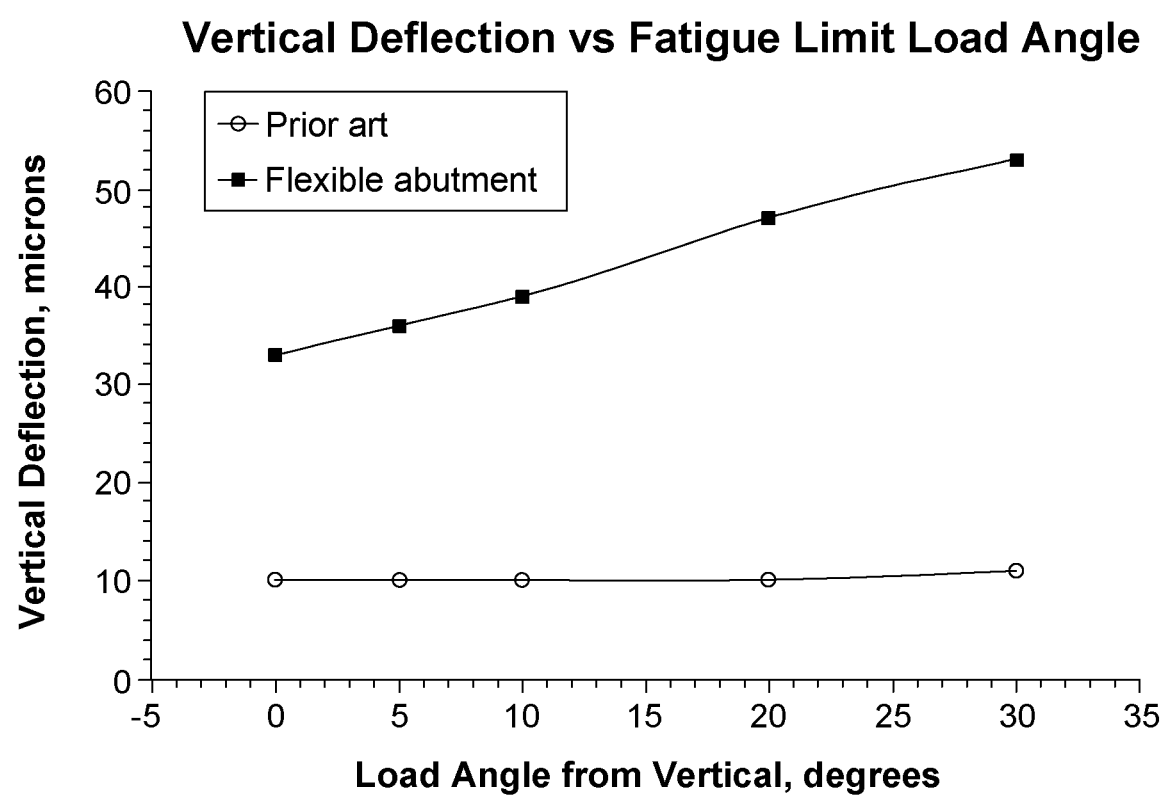
FIG. 10 is a graph of vertical deflection versus fatigue limit load angle, for a conventional abutment versus a flexible abutment as described herein.

FIG. 10 is a graph showing the vertical deflection versus fatigue limit load angle forces for a conventional abutment and a flexible abutment as described herein. The vertical deflection of the flexible abutment is approximately three times higher than the rocking deflection of the conventional abutment, i.e., is approximately of 30 microns. This extent of displacement obtained for the flexible abutment is similar to observed values for the deflection of natural teeth.

Figure 11:
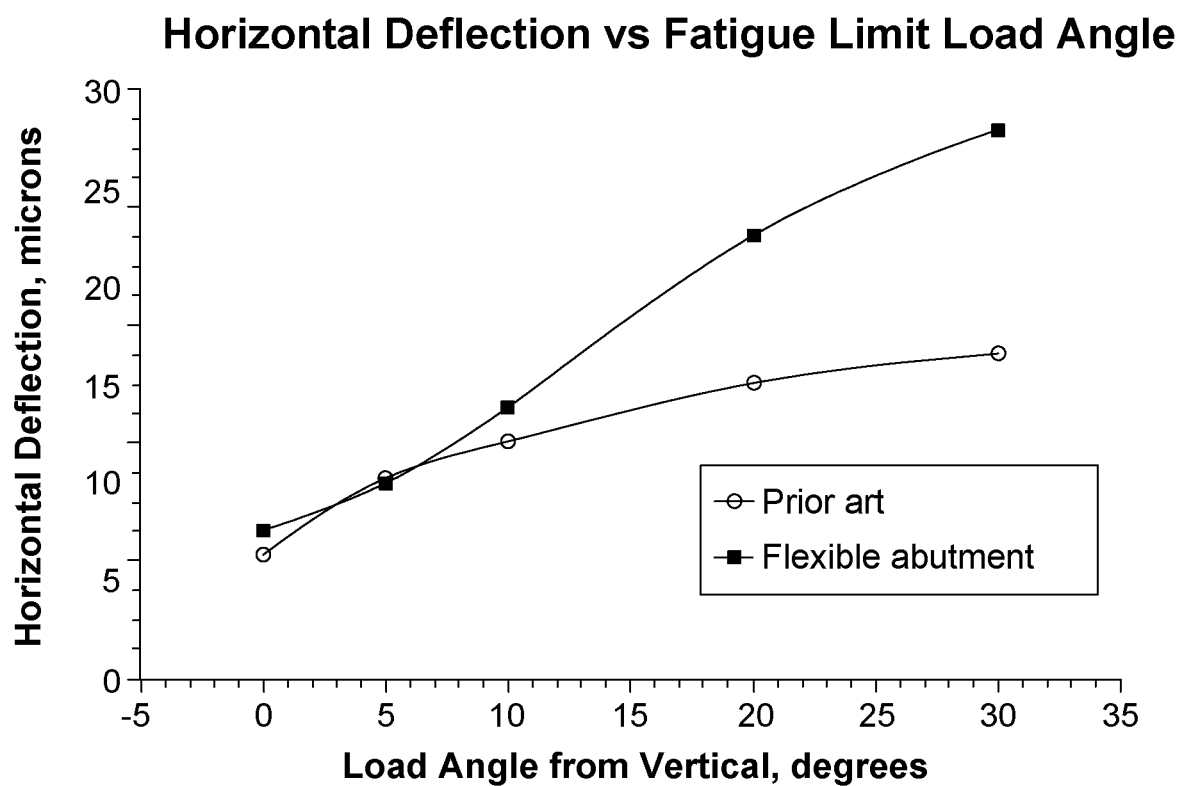
FIG. 11 is a graph of horizontal deflection versus fatigue limit load angle, for a conventional abutment versus a flexible abutment as described herein.

FIG. 11 is a graph showing the horizontal deflection versus fatigue limit load angle forces for a conventional abutment and a flexible abutment as described herein. The graph illustrates that the horizontal deflection of the flexible abutment as described herein is greater than the deflection of the conventional abutment.

What is claimed is:

1. An abutment for use in combination with a dental prosthesis and with a dental implant configured for implantation in an osseous structure, the abutment comprising:
   an abutment wall having an outer surface and an inner surface, the inner surface defining a longitudinally extending abutment channel configured to receive a retention assembly therein to engage the abutment with the dental implant; and
   a flexural region defined by the abutment wall and forming a monolithic structure with a remainder of the abutment, the flexural region comprising:
      a shoulder portion extending outwardly such that the abutment has a widest outer diameter at the shoulder portion; and
      an abutment recess located below the shoulder portion when the abutment is in an upright position, the abutment recess defining a reduced outer diameter of the abutment compared to the shoulder portion, each one of the shoulder portion and the abutment recess extending along at least a portion of a circumference of the abutment wall;
   the inner surface of the longitudinally extending abutment channel defining an abutment cavity at the shoulder portion, the abutment cavity remaining as a void once the abutment is engaged with the retention assembly;
   wherein the longitudinally extending abutment channel has a diameter that is larger at the shoulder portion than at the abutment recess; and
   wherein the flexural region is configured to enable at least a vertical movement of an upper portion of the abutment relative to a lower portion of the abutment when the abutment is subjected to a loading force during mastication.

2. The abutment of claim 1, wherein the flexural region is configured to enable a horizontal movement of the upper portion of the abutment relative to the lower portion of the abutment.

3. The abutment of claim 1, wherein the abutment wall has a wall thickness that is constant throughout the shoulder portion and the abutment recess.

4. The abutment of claim 1, wherein the abutment wall has a wall thickness that varies along the flexural region.

5. The abutment of claim 1, wherein the flexural region comprises at least one of an S-shaped flexural region, a wave-like flexural region, a bellows-like region, and a boustrophedonic-like flexural region.

6. The abutment of claim 1, wherein the flexural region extends along an entire circumference of the abutment.

7. The abutment of claim 1, wherein at least one of the shoulder portion and the abutment recess is provided at an angle relative to a transverse axis of the abutment.

8. The abutment of claim 1, wherein the retention assembly comprises:
   a male member positionable within the longitudinally extending abutment channel of the abutment; and
   a female member positionable within the longitudinally extending abutment channel and in the upper portion of the abutment, the female member comprising a female member receiving channel defined by a downwardly extending wall and being configured to receive at least a portion of the male member within the female member receiving channel.

9. The abutment of claim 8, wherein the female member of the retention assembly is fastenable to the abutment.

10. The abutment of claim 8, wherein the male member of the retention assembly is fastenable to the abutment.

11. The abutment of claim 8, wherein when the at least a portion of the male member of the retention assembly is received within the female member receiving channel, a female member chamber is defined in an upper portion of the female member receiving channel to enable the female member of the retention assembly to move downwardly and upwardly in a piston-like movement relative to the male member when the female member is subjected to a loading force.

12. The abutment of claim 11, wherein a lower end of the downwardly extending wall of the female member receiving channel is configured to abut a transversal surface of the abutment within the longitudinally extending abutment channel to stop the piston-like movement of the female member when the loading force is above a given threshold.

13. The abutment of claim 12, wherein the lower end of the downwardly extending wall female member receiving channel has a complimentary shape relative to the transverse surface of the abutment against which the lower end abuts.

14. The abutment of claim 12, wherein the female member chamber of the female member of the retention assembly is at least partially filled with a compressible material.

15. The abutment of claim 12, wherein the female member chamber of the female member of the retention assembly is at least partially filled with a gas.

16. The abutment of claim 8, wherein the male member and the female member of the retention assembly are configured to limit horizontal movement of the abutment up to a horizontal travel threshold.

17. The abutment of claim 8, wherein at least one of the male member and the female member of the retention assembly is sized and configured to allow the abutment to move in a selected direction while minimizing movement of the abutment in another direction.

18. The abutment of claim 1, wherein the abutment wall comprises a wall portion extending transversally relative to the abutment channel, between the shoulder portion and the abutment recess, the wall portion having an inner transversal surface and an outer transversal surface, opposite the inner transversal surface, a distance between the inner transversal surface and the outer transversal surface defining a thickness of the middle wall portion.

19. The abutment of claim 18, wherein the thickness of the middle wall portion is constant.

20. The abutment of claim 1, wherein the abutment wall comprises a wall portion between the shoulder portion and the abutment recess, the wall portion being provided at an angle relative to a transverse axis of the abutment.

\* \* \* \* \*